(12) United States Patent
Nishibayashi et al.

(10) Patent No.: US 7,873,986 B2
(45) Date of Patent: Jan. 18, 2011

(54) COMMUNICATION APPARATUS, AND DISPLAY TERMINAL

(75) Inventors: Yasuyuki Nishibayashi, Kawasaki (JP);
Shinya Murai, Kawasaki (JP);
Masataka Goto, Yokohama (JP);
Kensaku Yamaguchi, Yokohama (JP);
Shingo Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 864 days.

(21) Appl. No.: 11/723,740

(22) Filed: Mar. 21, 2007

(65) Prior Publication Data
US 2008/0013504 A1    Jan. 17, 2008

(30) Foreign Application Priority Data
Jul. 11, 2006    (JP) .......................... P2006-190975

(51) Int. Cl.
H04L 9/32    (2006.01)
(52) U.S. Cl. .............................................. 726/2; 726/3
(58) Field of Classification Search ................. 380/217, 380/247, 270; 345/1.1–1.3, 2.2–2.3, 204; 726/2–3; 713/181, 300, 324, 330, 340
See application file for complete search history.

(56) References Cited

U.S. PATENT DOCUMENTS

| 6,784,855 | B2 | 8/2004 | Matthews et al. |
| 7,009,579 | B1 * | 3/2006 | Kondo et al. .................. 345/1.2 |
| 7,194,155 | B1 * | 3/2007 | Kahn et al. .................... 385/27 |
| 2004/0158864 | A1 | 8/2004 | Kakemura |
| 2005/0288062 | A1 | 12/2005 | Hammerschmidt et al. |
| 2006/0023669 | A1 | 2/2006 | Yamaura et al. |
| 2006/0066595 | A1 | 3/2006 | Sampsell et al. |
| 2006/0084461 | A1 | 4/2006 | Sekiya et al. |

FOREIGN PATENT DOCUMENTS

| CN | 1750431 A | 3/2006 |
| EP | 1 244 303 | 9/2002 |
| EP | 1 445 690 | 8/2004 |
| EP | 1 640 957 | 3/2006 |
| JP | 2002-312155 | 10/2002 |
| JP | 2005-033284 | 2/2005 |
| JP | 2006-042075 A | 2/2006 |
| JP | 2006-115414 | 4/2006 |

OTHER PUBLICATIONS

Extended Search Report for EP 07251181.9, Aug. 2007 (9 pages).

* cited by examiner

*Primary Examiner*—Hosuk Song
(74) *Attorney, Agent, or Firm*—Nixon & Vanderhye, PC

(57) ABSTRACT

A communication apparatus includes a first generation unit which sequentially generates image data in accordance with an event occurring due to a change in an operating state of an application program; a difference detecting unit which detects a difference between a plurality of consecutive image data generated by the first generation unit; a second generation unit which generates send data to be sent to the display terminal by compressing to the difference; a message generating unit which generates a message to change the spatial multiplexing number to either one or a plural number according to the change in the operating state of the application program or the difference; and a sending unit which sends the message to the wireless access apparatus prior to sending to the display terminal of the send data generated by the second generation unit.

5 Claims, 12 Drawing Sheets

COMMUNICATION APPARATUS, AND DISPLAY TERMINAL

CROSS-REFERENCE TO RELATED APPLICATIONS

This application is based upon and claims the benefit of priority from the prior Japanese Patent Application No. 2006-190975, filed on Jul. 11, 2006; the entire contents of which are incorporated herein by reference.

BACKGROUND OF THE INVENTION

1. Field of the Invention

The present invention relates to a communication apparatus and a display terminal to realize a function of sharing a screen of an application, for example, between computers.

2. Description of the Related Art

There is a computing system in which for the purpose of improving usability, a terminal apparatus including a minimum of input/output interfaces is placed on the user side and complex computing is performed on a main apparatus located in a remote place.

For example, a system configuration in which screen information on a main apparatus (such as a personal computer or a server computer) is projected onto a remote display terminal via a network is already disclosed in U.S. Pat. No. 6,784,855 (hereinafter referred to as "Reference 1").

In this system, input information (such as a pen-based input by a digitizer) from the display terminal is similarly sent to the main apparatus via the network, and actual application program processing is executed by the main apparatus. Thereafter, a result of the execution and screen update information are transferred to the display terminal via the network. The terminal apparatus executes output (drawing) processing by the received screen update information.

On the other hand, as a technique for efficiently transmitting the screen information from the main apparatus on the remote network to the terminal apparatus, VNC (Virtual Network Computing) is known.

In this VNC, when an update of a screen is detected, a value of read pixel information is compared with a value of pixel information last transmitted to the display terminal, and an updated screen area changed from the last time is determined.

Further, by subjecting the updated screen area to still image compression and then transmitting only difference information on the compressed screen to the display terminal, communication band consumption can be suppressed.

Accordingly, the amount of screen information to be sent increases when a screen change such as a movement of a window is large, whereas the amount of screen information to be sent decreases when a screen change is small.

Incidentally, by performing MIMO (Multiple Input Multiple Output) transmission when the display terminal performs communication by wireless LAN, an effect of expanding an available distance range, an effect of improving response when large-sized data is transmitted, and so on are conceivable.

MIMO is a technique of simultaneously sending/receiving signals from plural antennas using the same frequency channel, but compared to SISO (Single Input Single Output: a conventional sending/receiving method by one antenna), the same number of sending/receiving circuits as that of antennas are needed, which causes a problem that power consumption increases in proportion to the number of antennas.

Hence, in recent years, a mechanism to reduce power consumption regarding MIMO is proposed, for example, in JP-A 2006-42075 (KOKAI) (hereinafter referred to as "Reference 2").

In the case of a technique in reference 2, during standby when frame exchange is not performed, a receiving terminal operates as a SISO one by activating only one of plural receiving systems, whereas at the time of frame exchange, it performs MIMO receiving processing by supplying power to the plural receiving systems.

Incidentally, among applications to execute processing by a computer, there are presentation software, text creating software, and so on, and in addition applications using a network including video streaming playback software, voice communication software, file transfer software, and so on, and the characteristic of traffic flowing over the network variously changes.

In the case of the application such as the video streaming playback software or the voice communication software which requires responsiveness, a data packet is generated in a given cycle and flows over the network.

In the case of the application such as the file transfer software which can tolerate transmission delay to a certain extent even if it is large, a large amount of traffic is generated in a burst manner simultaneously with the start of file transfer.

In the system in which the screen information is sent from the main apparatus on the remote network to the terminal apparatus and received and displayed by the terminal apparatus, for example, a movement of a cursor by a mouse manipulation is continuous small movements.

Therefore, the size of data transferred from the main apparatus to the terminal apparatus is small, and in contrast, if an event such as a new appearance, disappearance, or movement of the window occurs, the amount of a changed difference accompanying a screen update is large, so that the size of transferred data also becomes large.

Accordingly, a screen transfer system via such a network is characterized in that traffic is generated in a burst manner and responsiveness is required.

For example, let's assume a case where a terminal apparatus which includes a display (for example, a liquid crystal display panel or a projector projection unit) displaying screen information and a MIMO wireless communication processing unit receives screen information on a main apparatus on a remote network via the wireless communication processing unit and displays it.

In this case, in MIMO, compared to SISO, the power consumption increases in proportion to the number of antennas, and besides, a synchronous signal for a high throughput terminal in addition to a synchronous signal for a legacy terminal is needed in a physical layer.

Hence, there is a problem that when small-sized data is sent, the proportion of a fixed-length physical header portion of a transmitted physical frame becomes larger (this is called transmittion overhead), so that the transmitting efficiency in MIMO lowers compared to that in SISO.

Namely, if screen update information from the main apparatus is continuous small-sized one such as a movement of cursor by mouse, and MIMO transmission is performed, not only power consumption but also overhead at the time of transmission becomes large, which can be said to be inefficient.

In the case of the above technique in reference 2, during a standby state where frame exchange is not performed, power is supplied to only one receiving system out of plural receiving systems, and every time frame exchange is performed, power is supplied to the plural receiving systems to enable sending/receiving of the physical frame by MIMO, but when a data frame is exchanged, plural antennas are always activated in the receiving terminal.

Namely, there is a problem that also when such small updated screen information as does not need sending at a high physical transmission speed by MIMO is received, the wireless communication processing unit on the receiving terminal side is operated as the MIMO one, so that unnecessary power consumption is inevitable.

BRIEF SUMMARY OF THE INVENTION

A communication apparatus of one aspect of the present invention is a communication apparatus which connects to a display terminal via a wireless access apparatus allowed to freely change a spatial multiplexing number of a spatial multiplexing transmission path, comprises: a first generation unit which generates image data in accordance with an event occurring due to a change in an operating state of an application program; a difference detecting unit which detects a difference between a plurality of consecutive image data generated by said first generation unit; a second generation unit which generates send data to be sent to the display terminal by compressing to the difference; a message generating unit which generates a message to change the spatial multiplexing number to either one or a plural number according to the change in the operating state of the application program or the difference; and a sending unit which sends the send data to the display terminal and sends the message to the wireless access apparatus prior to sending the send data.

Further, a display terminal of one aspect of the present invention comprises: plural antenna branches which send/receive a message to/from a wireless access apparatus via a spatial multiplexing transmission path, and receive image data sent from a communication apparatus via the wireless access apparatus; a switching controller which if a message to change a multiplexing number of the spatial multiplexing transmission path is received by the antenna branch, switches the plural antenna branches to a communication state of either spatial multiplexing transmission or single transmission according to the message; a power-saving controller which while one antenna branch of the plural antenna branches is operating in the state of single transmission, stops power supply to the other antenna branches; a display which displays a screen; and an image generating unit which displays the image data from the communication apparatus received by the antenna branch at a specified position of the screen.

A communication method of one aspect of the present invention is a communication method of a communication apparatus which connects to a display terminal via a wireless access apparatus allowed to freely change a spatial multiplexing number of a spatial multiplexing transmission path, comprising: generating image data to be displayed on the display terminal in accordance with an event occurring due to a change in an operating state of an application program; detecting a difference between a plurality of consecutive image data generated data and the image data buffered in the buffer; generating send data to be sent to the display terminal by compressing to the detected difference; generating a message to change the spatial multiplexing number of the spatial multiplexing transmission path to either one or a plural number according to the change in the operating state of the application program which has caused the event or a value of the difference; and sending the message to the wireless access apparatus prior to sending the send data to the display terminal.

BRIEF DESCRIPTION OF THE SEVERAL VIEW OF THE DRAWINGS

DETAILED DESCRIPTION OF THE INVENTION

In an embodiment of the present invention described below, in transmitting an image of an updated portion due to an event occurring on a screen, lower power consumption is realized while the high-speed transmission performance of multiple input multiple output transmission is maintained.

The embodiment of the present invention will be described in detail below with reference to the drawings.

Figure 1:
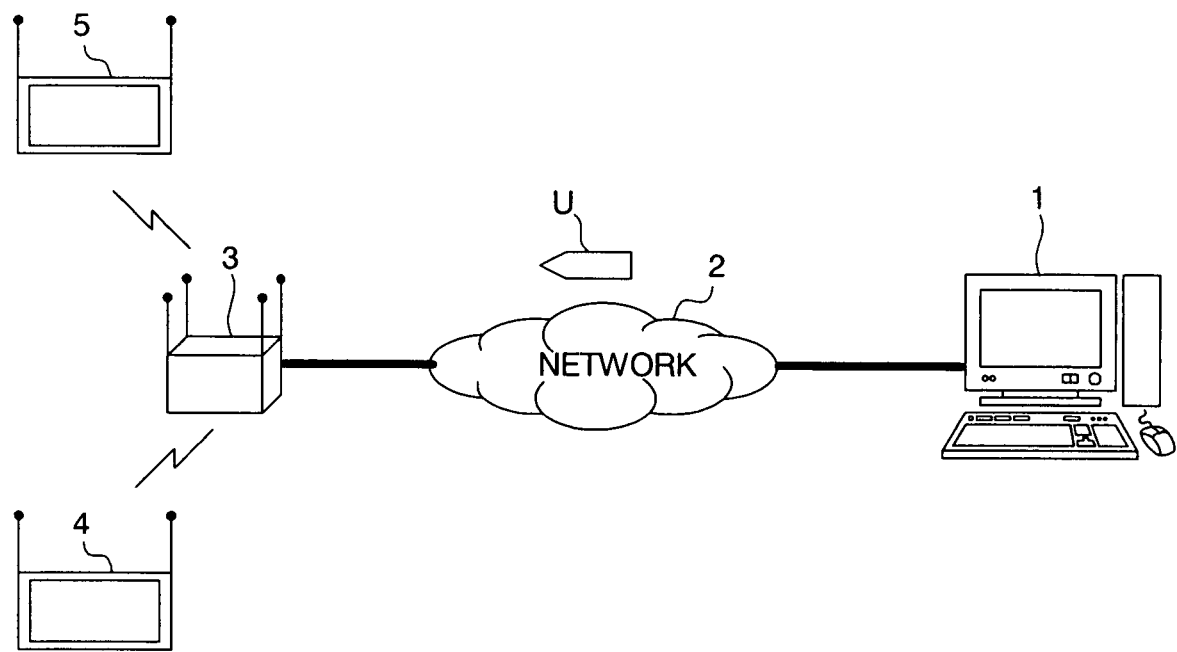
FIG. 1 is a diagram showing the configuration of a screen transfer system of one aspect of the present invention.

As shown in FIG. 1, a screen transfer system according to this embodiment includes a main apparatus 1 as a communication apparatus, an access point 3 as a wireless access apparatus connected to the main apparatus 1 via a network 2, and display terminals 4 and 5 as display terminals which link to the access point 3 by wireless LAN to perform wireless communication.

This screen transfer system has a so-called application screen sharing function of transferring a screen information of application software operating on the main apparatus 1 to the display terminals 4 and 5 by wireless via the access point 3 and displaying the screen of the application software on each of the display terminals 4 and 5.

In this system, to transfer the screen updated on the main apparatus 1 side to the display terminals 4 and 5 in real time, only image data (updated screen information U) on a portion updated in the screen of the main apparatus 1 is transferred.

The main apparatus 1 connects to the display terminals 4 and 5 via the access point 3 allowed to freely change a spatial multiplexing number of a spatial multiplexing transmission line. Namely, the main apparatus 1 can be said to be a communication apparatus which can send image data to the display terminals 4 and 5 via the access point 3 allowed to change a spatial multiplexing number of a transmission path.

Figure 2:
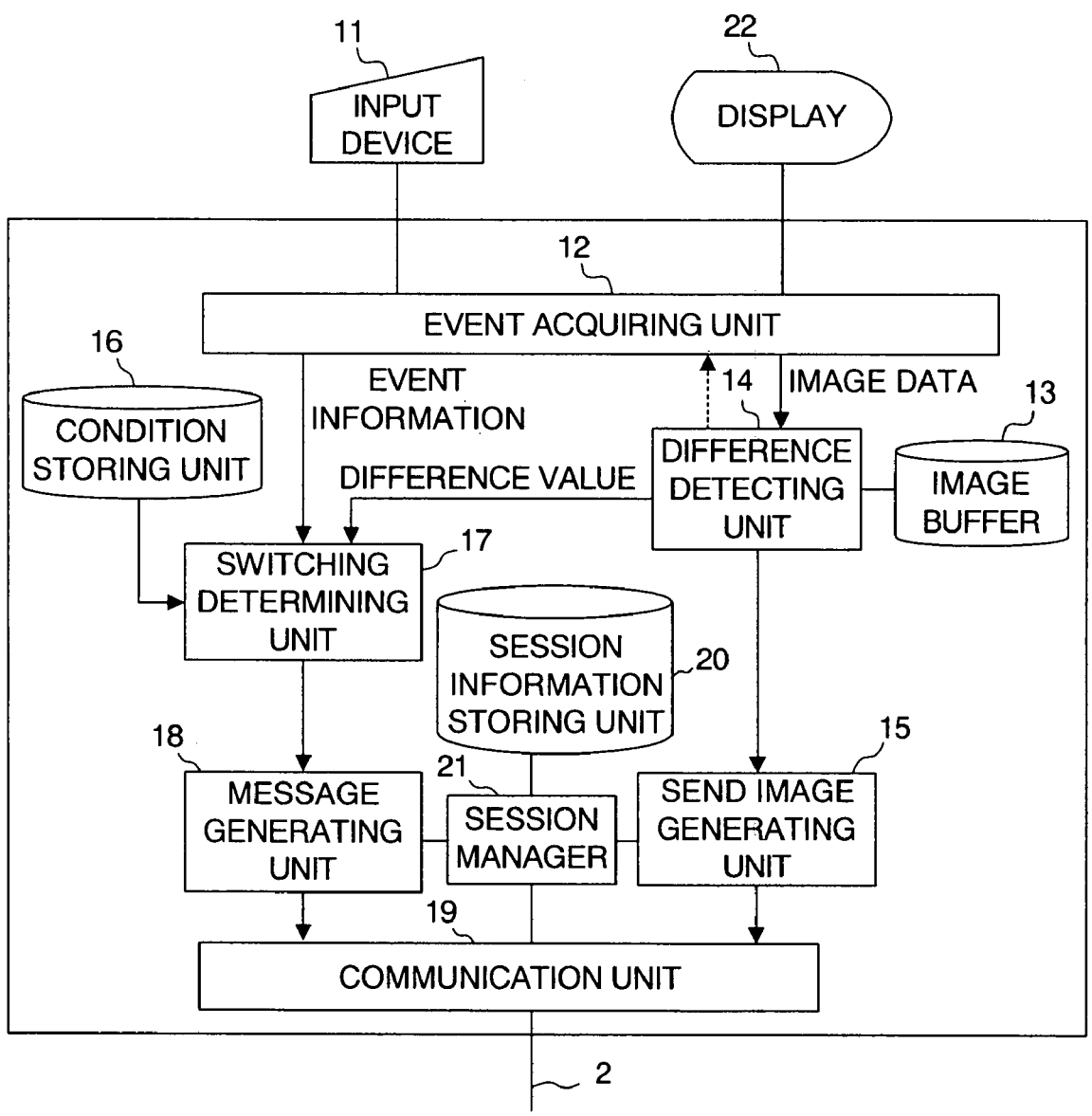
FIG. 2 is a diagram showing the configuration of a main apparatus.

As shown in FIG. 2, the main apparatus 1 includes an input device 11, an event acquiring unit 12, an image buffer 13, a difference detecting unit 14, a send image generating unit 15, a condition storing unit 16, a switching determining unit 17, a message generating unit 18, a communication unit 19, a session information storing unit 20, a session manager 21, a display 22, and so on.

Incidentally, it is also possible that with the functional configuration of the main apparatus 1 just described as a communication program, this communication program causes the main apparatus 1 to execute processing.

This main apparatus 1 is realized by a computer constituted of a central processing unit (hereinafter referred to as a "CPU"), a memory, a hard disk device, and so on.

The input device 11 is realized by a mouse to manipulate and move a cursor displayed on a screen of the display 22 or the like. In addition to this, a keyboard, a trackball, or the like may be used as the input device 11.

The event acquiring unit 12 is realized by an operating system (hereinafter referred to an "OS") integratedly controlling the computer, a virtual display driver having a function equal to that of a display driver incorporated in this OS, and an application program such as application software running on the OS.

If the screen is updated by the application software or an image of any area in the screen is updated by a cursor movement by a mouse manipulation or the like, the event acquiring unit 12 generates image data by the virtual display driver acquiring a draw command from a graphic engine of the OS and performing drawing processing and sequentially outputs it to the image buffer 13 to be stored therein.

Thus, the image data is sequentially held in the image buffer 13.

Namely, the event acquiring unit 12 functions as a first generation unit which sequentially generates image data to be displayed on the display terminals 4 and 5 in accordance with an event occurring due to a change in the operating state of the application program.

The difference detecting unit 14 detects an image of a difference between the new and old images (a plurality of consecutive image data) sequentially held in the image buffer 13. Namely, it detects a difference between new image data generated by the event acquiring unit 12 and old image data buffered in the image buffer 13.

In the session information storing unit 20, information on destinations of the display terminals 4 and 5 which are currently establishing sessions with itself (the main apparatus 1) via the access point 3 including user identifying information, and information indicating whether the sessions are being used or not, information as to whether transmission control is done by TCP or UDP, and so on are stored in association with each other.

In FIG. 1, in a state where the sessions are being established between the main apparatus 1 and the display terminals 4 and 5, spatial multiplexing transmission is also possible between the access point 3 and the display terminals 4 and 5 concerned.

Namely, in such a system, many display terminals 4 and 5 sometimes establish sessions with one main apparatus 1, so that the information to identify the destination of a packet sent from the main apparatus 1 is stored in the session information storing unit 20.

The send image generating unit 15 generates send image data being a compressed image by subjecting the image of the difference detected by the difference detecting unit 14 to compression processing for sending.

In other words, the send image generating unit 15 functions as a second generation unit which generates the send image data (send data) to be sent to the display terminals 4 and 5 via the access point 3 by compressing to the difference detected by the difference detecting unit 14.

The send image generating unit 15 and the difference detecting unit 14 are realized by screen transfer application software or the like.

In the condition storing unit 16, a determination condition for switching between states of MIMO (Multiple Input Multiple Output: multiplex transmission) and SISO (Single Input single Output: single transmission), that is, a threshold value to compare with a data amount of the image of the difference is stored.

Also event information generated by the application software or the like and information indicating switching direction between MIMO and SISO are stored.

While the access point 3 and the display terminals 4 and 5 are operating based on MIMO, plural signals can be multiplexed and sent/received through the same channel, which enables high-speed communication.

The condition storing unit 16 functions as a storage unit which associates and stores the event information generated by the operation of the application software and spatial multiplexing number switching information (such as a flag) on a spatial multiplexing transmission path of the access point 3.

If the event information is about an event, for example, indicating that the application software has opened a screen, "1" as a flag indicating switching from SISO to MIMO is stored.

If it is about an event indicating that the application software has closed the screen, "0" as a flag indicating switching from MIMO to SISO is stored.

Incidentally, positive logic is used here in which the flag indicating switching from SISO to MIMO is "1" and the flag indicating switching from MIMO to SISO is "0", but it is needless to say that realization is also possible even if negative logic is used.

The switching determining unit 17 functions as a determination unit which compares the data amount of the image of the difference detected by the difference detecting unit 14 and the threshold value previously stored (set) in the condition storing unit 16 to determine whether or not the spatial multiplexing number of the spatial multiplexing transmission path is varied.

For example, when the data amount of the image of the difference is larger than the predetermined threshold value, the data amount to be transferred is large, so that the switching determining unit 17 determines switching from SISO to MIMO.

Namely, the switching determining unit 17 determines that the operating state by a single antenna branch of a wireless communication processing unit 43 of each of the display terminals 4 and 5 is changed to the operating state by all antenna branches.

Further, the switching determining unit 17 searches (refers to) the condition storing unit 16 with the event information inputted from the event acquiring unit 12 as a key, and determines by the above flag "0" or "1" associated with the hit event information whether the operating states of the wireless communication processing units 43 of the display terminals 4 and 5 are changed or not and to which direction they are changed.

"which direction" means a direction in which the communication speed increases (SISO→MIMO) or a direction in which the power consumption decreases (MIMO→SISO).

When the difference detected by the difference detecting unit 14 is larger than the predetermined threshold value, the message generating unit 18 generates a message to make a change to increase the spatial multiplexing number of the spatial multiplexing transmission path between the access point 3 and each of the display terminals 4 and 5, for example, from one to a multiple number (plural number).

Namely, the message generating unit 18 generates the message indicating a change in the communication state determined to be changed by the switching determining unit 17.

Incidentally, in this example, the spatial multiplexing number of the spatial multiplexing transmission path when the difference is larger than the threshold value is changed from one to the multiple number, but in addition to this, it may be changed from two to a multiple number or may be changed from a minimum number to a maximum number.

The message generating unit 18 generates the message to change the spatial multiplexing number of the spatial multiplexing transmission path of the access point 13 from the information on the event acquired by the event acquiring unit 12 with reference to the condition storing unit 16.

The communication unit 19 sends the message generated by the message generating unit 18 and the send image data generated by the send image generating unit 15 to the display terminals 4 and 5 which have corresponding identification information designated by the session manager 21 via the access point 3.

The communication unit 19 functions as a sending unit which sends to the access point 3 the message generated by the message generating unit 18 prior to sending to the display terminals 4 and 5 of the send image data generated by the send image generating unit 15.

Namely, The communication unit 19 sends the send image data to the display terminal after sends the message to the access point 3.

Also, the communication unit 19 functions as a sending unit which sends the message generated by the message generating unit 18 to the access point 3 prior to the sending of the send image data generated by the send image generating unit 15 corresponding to the image data generated in accordance with the information on the event acquired by the event acquiring unit 12.

The main apparatus 1 performs application processing of each of the display terminals 4 and 5 and, if as a result of the processing, a change occurs in the state of the screen, performs still image compression on difference information on an updated screen, that is, a so-called updated image and sends it as the updated screen information U to the display terminals 4 and 5.

Figure 3:
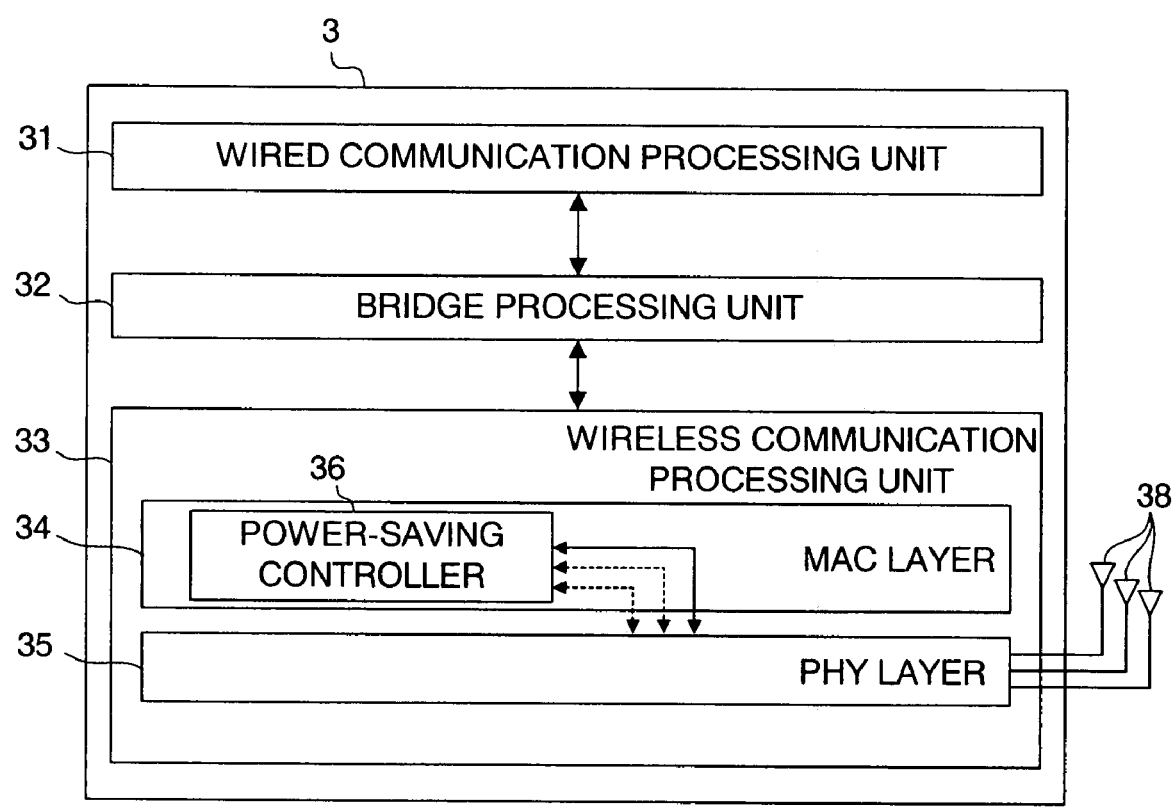
FIG. 3 is a diagram showing the configuration of an access point.

As shown in FIG. 3, the access point 3 includes a wired communication processing unit 31 based on IEEE802.3, a wireless communication processing unit 33 which complies with IEEE802.11n and performs information transmission by MIMO, a bridge processing unit 32 which exchanges information between them, and plural antennas 38 connected to the wireless communication processing unit 33.

The wireless communication processing unit 33 includes the power-saving controller 36 which controls power saving operation of wireless communication unit. If the power-saving controller receives the negotiation packet for changing the state from MIMO to SISO, it stores information that the display terminal can't receive any MIMO packets from the access point.

The wireless communication processing unit 33 performs a switching operation to either one communication state of MIMO or SISO using the plural antennas 38 in a PHY layer 35.

The wireless communication processing unit 33 is provided with analog circuits 62 (See FIG. 6) individually to operate the respective antennas 38.

The analog circuit 62 is a circuit which after performing frequency conversion suited to the transmission path such as a 2.4 GHz band or a 5 GHz band, performs amplification of an analog signal, noise filtering, and sending of the signal via the antenna 38. Namely, one antenna branch is constituted including each antenna 38 and its counterpart, analog circuit 62.

The antenna branch sends and receives, that is, communicates a message by a spatial multiplexing transmission method capable of multiplexing and sending/receiving plural signals through the same channel between itself and each of the display terminals 4 and 5.

While the wireless communication processing unit 33 is operating based on MIMO, power is supplied to all of the plural antenna branches, so that the power consumption can be said to be relatively large.

Figures 5, 6:
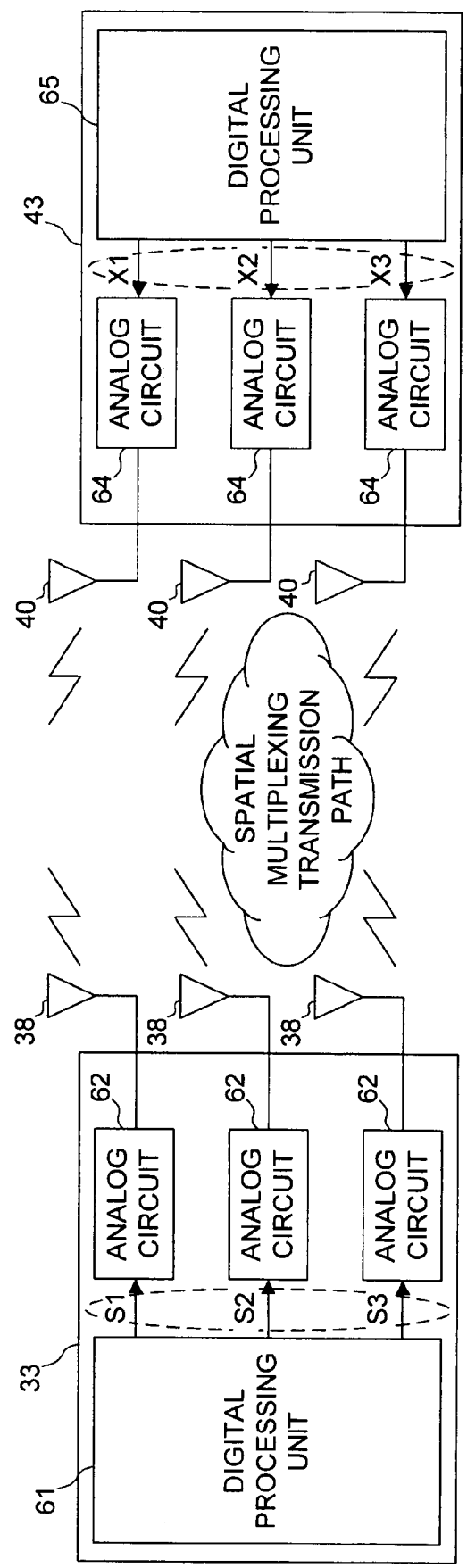
FIG. 5 is a diagram showing an example of a MIMO/SISO switching request packet.
FIG. 6 is a diagram to explain MIMO spatial multiplexing transmission.

Further, the wireless communication processing unit 33 is provided with a digital processing unit 61 (See FIG. 6).

After creating a baseband digital signal and converting it into an analog signal through a DAC (Digital Analog Converter), the digital processing unit 61 passes it to the analog circuit 62. The constitution of the antenna branch just described is the same between the display terminals 4 and 5.

In this access point 3, data inputted from the outside through the wired communication processing unit 31 is passed to the wireless communication processing unit 33 after transferred and subjected to filtering processing by the bridge processing unit 32.

Contrary to this, data inputted through the wireless communication processing unit 33 is passed to the wired communication processing unit 31 after transferred and subjected to filtering processing by the bridge processing unit 32.

When an updated image of the screen is received by the wired communication processing unit 31, the access point 3 determines from information on connection with the display terminals 4 and 5 in a MAC (Medium Access Control) layer whether or not the display terminals 4 and 5 can receive a physical frame by MIMO, thereafter selects an appropriate transmission speed, and sends the frame to a wireless transmission path (spatial multiplexing transmission path).

Figure 4:
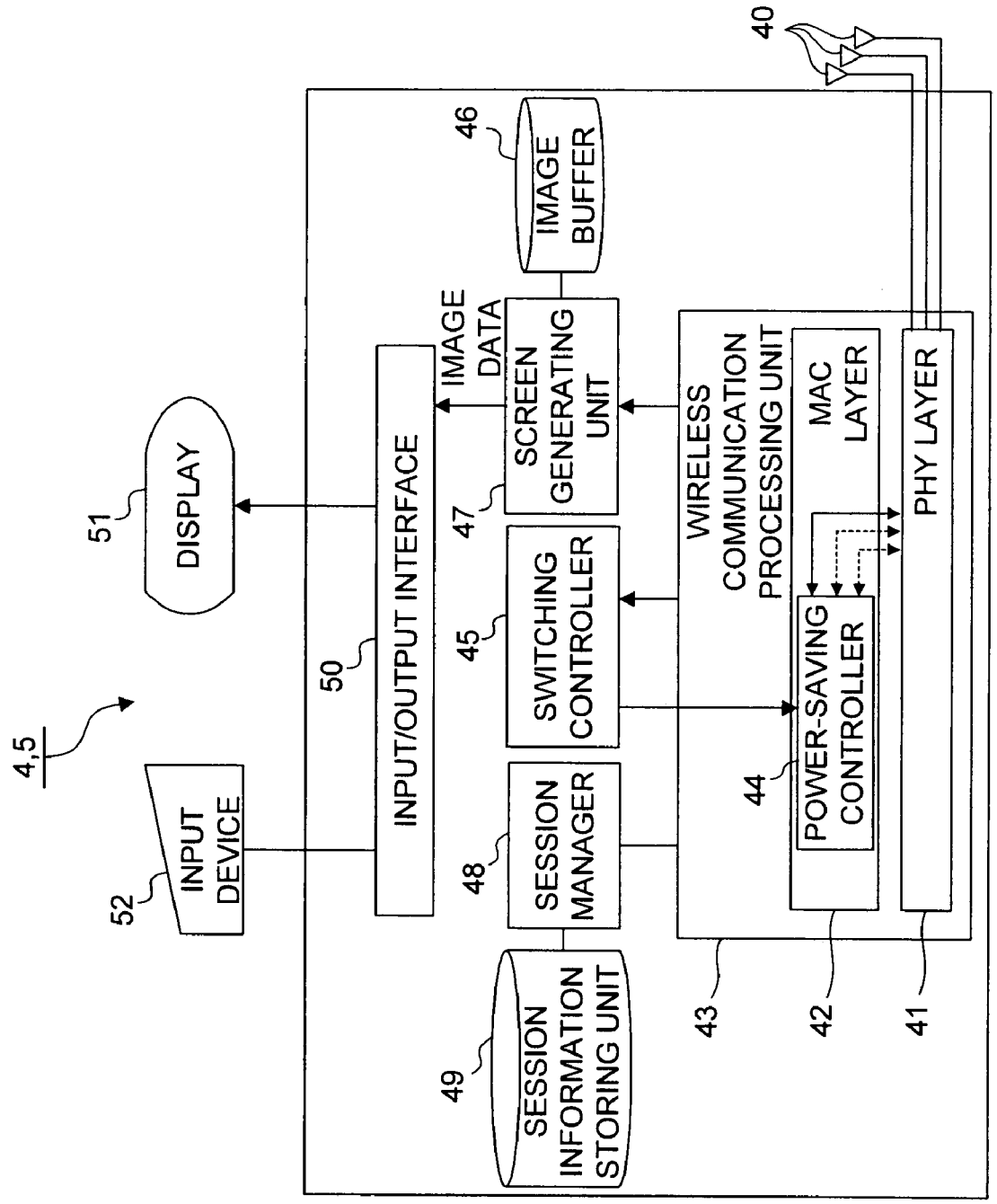
FIG. 4 is a diagram showing the configuration of a display terminal.

As shown in FIG. 4, the display terminals 4 and 5 each include the wireless communication processing unit 43 to which plural antennas 40 are connected, a switching controller 45 which performs MIMO/SISO switching control, an image buffer 46 as a video memory, a screen generating unit 47, a session manager 48, a session information storing unit 49, an input/output interface 50, a display 51, an input device 52, and so on.

The wireless communication processing unit 43 is provided with a power-saving controller 44 and plural antenna branches (RF section or analog section). One antenna branch includes an antenna 40 and an analog circuit 64 to operate this antenna 40 (See FIG. 6).

Namely, one antenna branch is a set (pair) of one analog circuit 64 and one antenna 40.

The antenna branch sends and receives, that is, communicates a message via a spatial multiplexing transmission path capable of multiplexing and sending/receiving plural signals through the same channel between itself and the access point 3.

When one antenna branch out of the plural antenna branches is operating in the state of SISO transmission, the power-saving controller 44 is controlled by the switching controller 45 to stop power supply to the other antenna branches.

The wireless communication processing unit 43 receives a wireless signal sent from the main apparatus 1 by the plural antennas 40.

The wireless communication processing unit 43 demodulates the received wireless signal to generate a packet, and passes its corresponding data to the switching controller 45 or the screen generating unit 47 according to a message type of the packet.

If the packet is a data packet in the screen transfer system, a compressed image extracted from the packet is passed to the screen generating unit 47.

After subjecting the passed compressed image to decompression processing, the screen generating unit 47 writes the decompressed image data into a specified drawing position of the image buffer 46 for drawing.

Namely, the screen generating unit 47 displays a partial image generated by decompressing the compressed image sent from the main apparatus 1 and received by the antenna branch at a specified position of the display 51.

If the packet is a MIMO/SISO switching request packet (See FIG. 5), the packet is passed to the switching controller 45.

The switching controller 45 extracts information on switching between SISO and MIMO such as MIMO/SISO switching parameter, time information, screen size information, and event information from the passed packet, and performs switching control of the state of the wireless communication processing unit 43 according to the extracted information.

Namely, if the message sent from the main apparatus 1 which is establishing a session with itself via the access point 3 and received by the antenna branch is the MIMO/SISO switching request packet, the switching controller 45 switches the plural antenna branches to either the communication state of MIMO transmission or SISO transmission in accordance with the message of the packet and thereafter notifies the access point 3 currently under communication through the antenna branch that the communication state is changed.

In the case of this example, the wireless communication processing unit 43 is usually in a state of performing SISO transmission by a single antenna branch, and, when the value of the MIMO/SISO switching parameter contained in the MIMO/SISO switching request packet indicates switching to MIMO, switches the operating states of the antenna branches to a state of performing MIMO transmission.

FIG. 5 shows an example of the MIMO/SISO switching request packet sent to the display terminals 4 and 5 by the main apparatus 1.

As shown in FIG. 5, the MIMO/SISO switching request packet is constituted of an IP header, a UDP/TCP header, a message type, a MIMO/SISO switching parameter, time information, screen size information, event information, and so on.

Out of these, the MIMO/SISO switching parameter, the time information, the screen size information, the event information, and so on are control information on MIMO/SISO switching.

The IP header is an IP (Internet Protocol) header as control information on a network layer. The UDP/TCP header is a header indicating whether transmission control uses UDP (User Datagram Protocol) or TCP (Transmission Control Protocol) as control information on a transport layer.

In the message type, information indicating a unique message type to identify the MIMO/SISO switching request packet is set.

The switching parameter is a field to specify an instruction to switch the state of the wireless communication processing unit of the display terminal to SISO or an instruction to switch it to MIMO.

For example, if the value of the MIMO/SISO switching parameter is "1", this means the instruction to switch from SISO to MIMO.

The switching controller 45 determines switching from SISO to MIMO in accordance with the instruction of this parameter and controls the wireless communication processing unit 43.

If the value of the parameter is "0", this means the instruction to switch from MIMO to SISO. The switching controller 45 determines switching from MIMO to SISO in accordance with the instruction of this parameter and controls the wireless communication processing unit 43.

It is needless to say that the method of specifying the parameter may use negative logic as well as positive logic as described above.

In the field of the screen size information, an area and a size (in terms of bytes) of a screen rectangular area which the main apparatus 1 is going to send is specified (set).

The event information is an area in which information, for example, as to which application state change (such as appearance and disappearance of a window) causes an update of the screen is written.

In the session information storing unit 49, similarly to the constitution example of the main apparatus 1, information to identify a destination with which the session is being established (for example, user identifying information on the main apparatus 1) and a transport protocol (TCP/UDP) in association with each other are stored as session information.

The session manager 48 stores information on the session with the main apparatus 1 with which the session is being established in the session information storing unit 49.

The session manager 48 reads the destination stored in the session information storing unit 49 and uses it as a destination of a packet to be sent.

Namely, the session manager 48 manages a session status with the main apparatus 1.

The wireless communication processing unit 43 performs communication processing based on the IEEE802.11n standard. In IEEE802.11 in which CSMA/CA (Carrier Sense Multiple Access with Collision Avoidance) is adopted as medium access control, the communication speed is increased by changing a protocol of a Physical layer 41 (hereinafter referred to as a "PHY" layer 41).

In the 2.4 GHz frequency band, IEEE802.11b (11 Mbps) and IEEE802.11g (54 Mbps) standards are derived from IEEE802.11 (2 Mbps), and they are also supported.

In the 5 GHz frequency band, currently IEEE802.11a (54 Mbps) exists, and this frequency band is also supported by the wireless communication processing unit 43.

Further, in order to set a standard aiming at an increase in speed both in the 2.4 GHz band and the 5 GHz band, IEEE802.11 TGn (TGn: Task Group n) is founded, a standardization work is currently being performed, and IEEE802.11n Draft 1.0 is already released.

In IEEE802.11n, a technique for increasing the transmission speed in the PHY layer by MIMO in which plural signals are multiplexed and sent (or received) through the same channel is adopted.

Further, in IEEE802.11n, after changing a power supply state of a receiving system to perform switching between MIMO and SISO, this terminal performs notification processing in a medium access control layer 42(hereinafter referred to as a "MAC layer 42") on the access point 3, which realizes power-saving control of MIMO.

The wireless communication processing unit 43 has the above communication function by MIMO and power-saving control function of MIMO in IEEE802.11n.

Concretely speaking, the wireless communication processing unit 43 includes the power-saving controller 44 which saves power in a MAC layer 42.

The wireless communication processing unit 43 performs a switching operation to either one communication state of MIMO or SISO using the plural antennas 40 in a PHY layer 41.

The input/output interface 50 outputs image data and audio data received from the main apparatus 1 via the network 2 to the display 51 and a speaker. The display 51 displays a screen sent from the main apparatus 1.

The input device 52 is a digitizer, a keyboard, or the like.

The input/output interface 50 notifies the screen generating unit 47 of information on a pen-based input by the digitizer or an input by the keyboard. The screen generating unit 47 generates a screen in accordance with the input information from the input device 52.

Now, MIMO spatial multiplexing transmission will be described with reference to FIG. 6.

MIMO is a technique for sending signals using the same frequency channel.

As shown in FIG. 6, the wireless communication processing unit 33 of the access point 3 converts respective pieces of send signal information S1, S2, and S3 from the digital processing unit 61 into analog signals, passes the analog signals to the plural analog circuits 62 respectively, and sends them from the plural antennas 38 to the spatial multiplexing transmission path simultaneously.

Accordingly, in MIMO, the sending speed increases in proportion to the number of sending antennas, but the number of sending/receiving circuits is larger compared to the conventional communication state of only SISO, which causes a problem that power consumption also increases in proportion to the number of antennas (and analog circuits).

In the wireless communication processing unit 43 of each of the display terminals 4 and 5 on the receiving side, respective signals are received in an interference state by the plural antennas 40 and subjected as respective pieces of information X1, X2, and X3 to signal amplification processing, frequency conversion, and so on by the respective analog circuits 64, and these pieces of information X1, X2, and X3 in the interference state are restored to an original frame construction by performing separation processing on baseband signals by one digital processing unit 65, and then passed to a higher layer to undergo subsequent processing.

Next, referring to FIG. 7 and FIG. 8, formats of a physical frame at the time of sending by SISO and a physical frame at the time of sending by MIMO will be described.

Figure 7:
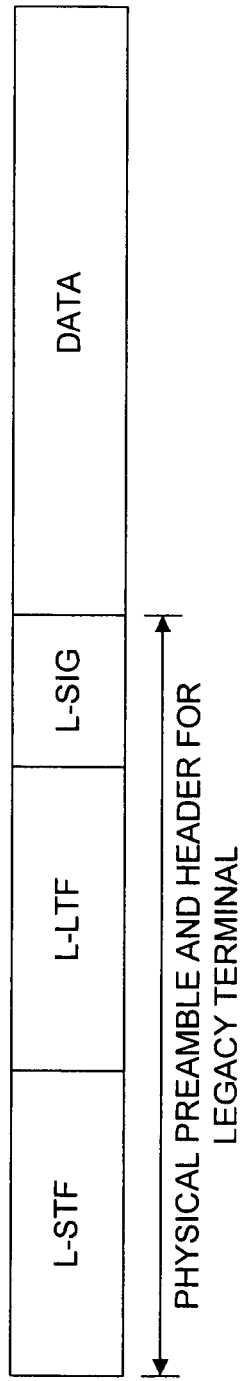
FIG. 7 is a diagram showing the format of a physical frame at the time of sending by SISO.

As shown in FIG. 7, the physical frame at the time of sending by SISO is constituted of fields including L-STF, L-LTF, L-SIG, and DATA.

L-STF represents Legacy-Short Training Field, L-LTF represents Legacy-Long Training Field, and L-SIG represents Legacy-Signal.

L-STF is mainly used for timing detection. L-LTF is mainly utilized for channel estimation.

The content of L-SIG is constituted of a field indicating a physical transmission speed and a byte length of a data division and also called a PLCP (PHY layer Convergence Protocol) header.

The content of DATA is constituted of PSDU (PLCP Service Data Unit: data body transmitted by the physical layer), an additional overhead bit to terminate convolution coding, and so on.

Coding OFDM (Orthogonal Frequency Division Multiplexing) covers the content of DATA.

In the display terminals 4 and 5 on the receiving side, decoding processing of a DATA field portion is performed based on transmission speed information in the PLCP header.

Figure 8:
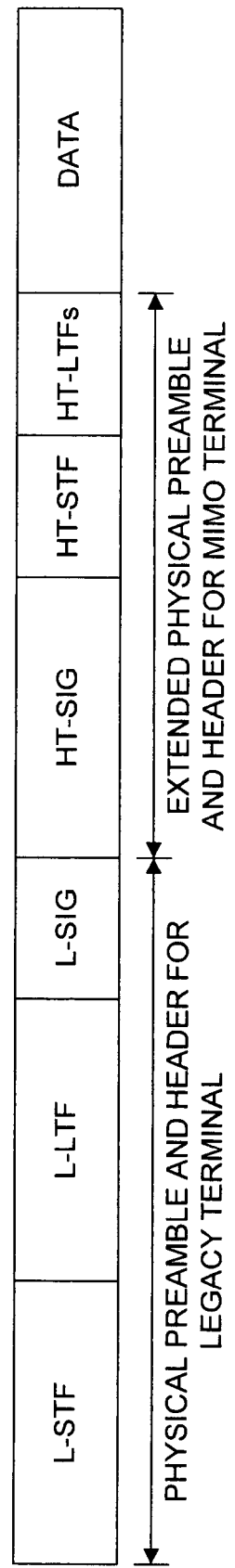
FIG. 8 is a diagram showing the format of a physical frame at the time of sending by MIMO.

As shown in FIG. 8, the MIMO physical frame is constituted of fields including L-STF, L-LTF, L-SIG, HT-SIG, HT-STF, HT-LTFs, and DATA.

Namely, when the MIMO physical frame is sent, in addition to L-STF, L-LTF, L-SIG as the fields for a legacy terminal shown in FIG. 7 described above, fields of an extended physical preamble HT-SIG and a header for a high throughput terminal become necessary.

HT-SIG represents High throughput-Signal, HT-STF represents High Throughput-Short Training Field, and HT-LTF represents High Throughput-Long Training Field, and they are used for physical transmission speed, data length information, timing detection, and channel estimation.

As just described, in MIMO transmission, fixed-length overhead additionally occurs in the PHY layer, and hence, when small-sized data is sent, the time needed for transmission (duration) becomes longer compared to SISO transmission, which causes a deterioration in responsiveness.

Accordingly, it is desirable to use SISO transmission for small-sized data and MIMO transmission for large-sized data.

Moreover, in a MIMO state where power is supplied to all of plural antenna branches (antennas, analog circuits) of the wireless communication processing units 33 and 43, power consumption is large.

Power saving can be realized by switching to a SISO state where power is supplied to only one antenna branch (receiving system), but in this state, normal reception processing cannot be performed on the receiving side even if the sending side performs frame transmission using MIMO.

Namely, if the access point 3 on the sending side transmits signals using plural antennas 38, and the same number of antenna branches (antennas 40 and analog circuits 64) are not activated in the display terminals 4 and 5 on the receiving side, the display terminals 4 and 5 cannot receive and analyze the MIMO physical frame sent from the access point 3.

Hence, in this screen transfer system, the wireless communication processing unit 43 of each of the display terminals 4 and 5 negotiates the communication state with the wireless communication processing unit 33 of the access point 3 and notifies the wireless communication processing unit 33 of the state (available transmission speed, number of spatial streams (antennas), power-saving state) of the wireless communication processing unit 43.

Consequently, the access point 3 recognizes a physical frame format which can be received by each of the display terminals 4 and 5 and determines a proper transmission speed and the number of spatial streams, and thereafter communication is started.

Further, in this screen transfer system, a MIMO power save management action MAC frame already defined as a power saving method for power saving of MIMO in IEEE802.11n Draft 1.0 is used.

Figure 9:
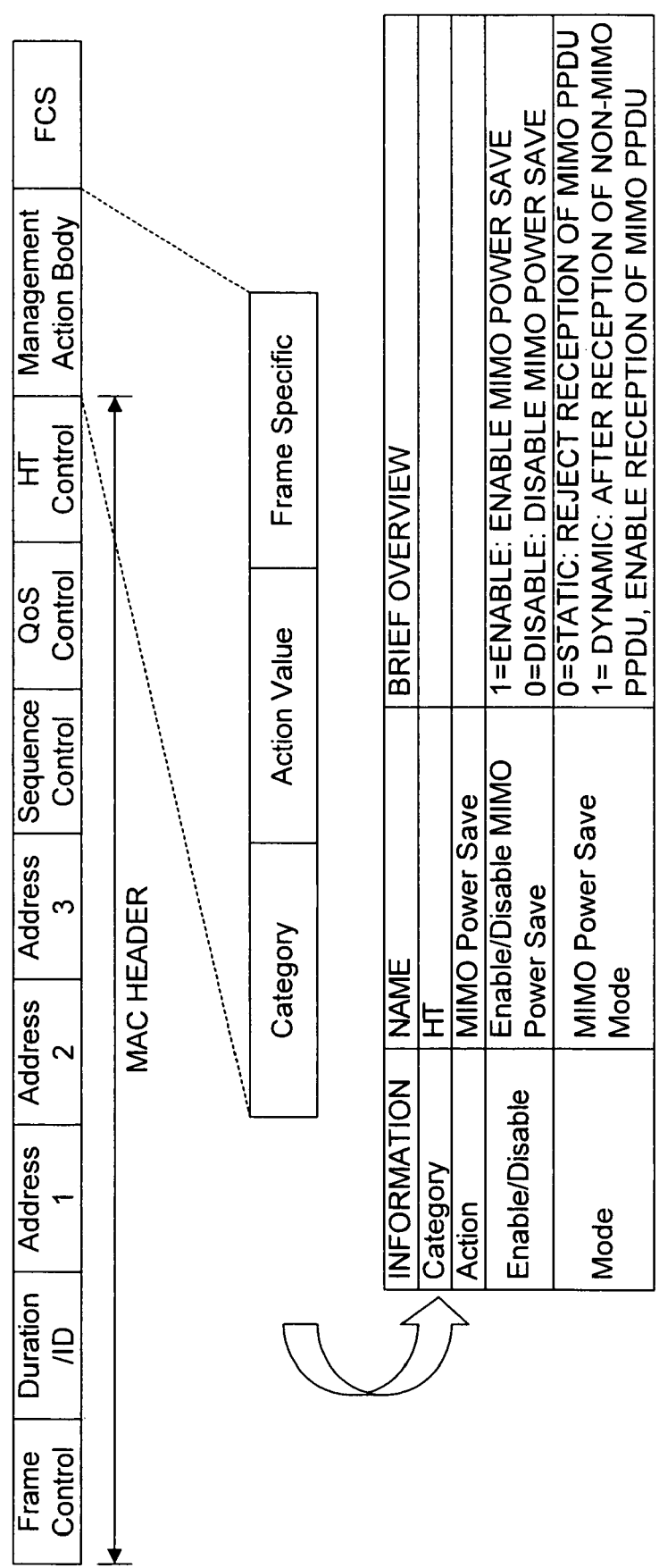
FIG. 9 is a diagram showing the format of a MIMO power save management action frame.

As shown in FIG. 9, the MIMO power save management action frame is constituted of a MCA header including fields of Address (destination), QoS Control, and so on, Management Action Body (management action control information), and FCS (Frame Check Sequence) for error detection.

If a MIMO Power Save Enable/Disable portion of the management action control information is designated as "Disable", there is no limit to the transmission system (MIMO/SISO) of the physical frame to the display terminals 4 and 5, so that the access point 3 can freely select from candidates for the available transmission speed rate and the number of spatial streams (antennas) and send the selected ones.

Further, if the MIMO Power Save Enable/Disable portion is designated as "Enable", the access point 3 determines a static MIMO power save mode in which the reception of MIMO PPDU (Physical Protocol Data Unit) is entirely rejected or a dynamic MIMO power save mode started as MIMO at the time of frame exchange.

Incidentally, PPDU represents a transmission unit in the PHY layer including the physical preamble, the header, and the data division.

By sending this MIMO power save management action MAC frame from each of the display terminals 4 and 5 to the access point 3, the access point 3 is notified of the current states of the display terminals 4 and 5.

Incidentally, the method of negotiating the state of MIMO power save between the display terminals 4 and 5 and the access point 3 can be also performed by a method of using a MIMO power save bit in a HT (High Throughput) capability field in a control frame (Association Request/Response) during association as well as using the MIMO power save management action frame.

The operation of this screen transfer system will be described below with reference to FIG. 10 to FIG. 15.

First, a general operation of this screen transfer system will be described.

A case where an application screen sharing function is realized between the display terminal 4, for example, out of plural display terminals 4 and 5 and the main apparatus 1 by using a screen transfer application such as VNC (Virtual Network Computing) and transferring screen information on the main apparatus 1 to the display terminal 4 will be described as an example.

In this case, in the main apparatus 1, the event acquiring unit 12 outputs a changed partial image of a screen obtained from the OS.

The difference detecting unit 14 detects a screen state from the received partial image and sequentially sends the received partial image to the display terminal 4 while storing it in the image buffer 13.

Further, every time the partial image is newly inputted, the difference detecting unit 14 finds a difference from the image sent to the display terminal 4 the last time from the image buffer 13 and then sends only the portion of the difference, that is, the updated image to the send image generating unit 15.

The send generating unit 15 performs still image compression on the inputted updated image to generate a compressed image, and also receives destination information from the session manager 21 to generate a packet for sending and passes it to the communication unit 19.

The communication unit 19 sends the passed packet to the network 2. This packet is called the updated screen information U.

Incidentally, although updates of the screen continuously occur, frame dropping processing of an acquired rectangular area is performed according to an available band of the network 2 to select screen information to be actually sent, and thereafter the selected image information is subjected to still image compression and transmitted.

The still image compression processing in the send image generating unit 15 may be performed by lossy compression such as JPEG (Joint Photographic Experts) or by a loss less compression method.

The updated screen information U sent from the main apparatus 1 to the network 2 is sent from the plural antennas 38 of the access point 3 to the spatial multiplexing transmission path.

In the display terminal 4, the updated screen information U transmitted by wireless from the access point 3 is received by the plural antennas 40, decoded into the compressed image by the wireless communication processing unit 43, and then passed to the screen generating unit 47.

The screen generating unit 47 draws rectangular image information in a specified area by performing decompression processing of the passed compressed image and then writing the resulting image in the image buffer 46.

Accordingly, if there occurs a large image change such as a movement of the entire window (frame) on a window system, the size of the image to be transmitted to the display terminal 4 also becomes larger. In contrast, if there occurs an image change with respect to a small movement such as manipulation of a cursor movement by the mouse, the size of the image to be transmitted becomes smaller.

Namely, in a situation in which the traffic of the screen transfer system requires both burst manner and responsiveness, the size of each transmission frame changes in conjunction with the state of an upper application.

Figure 10:
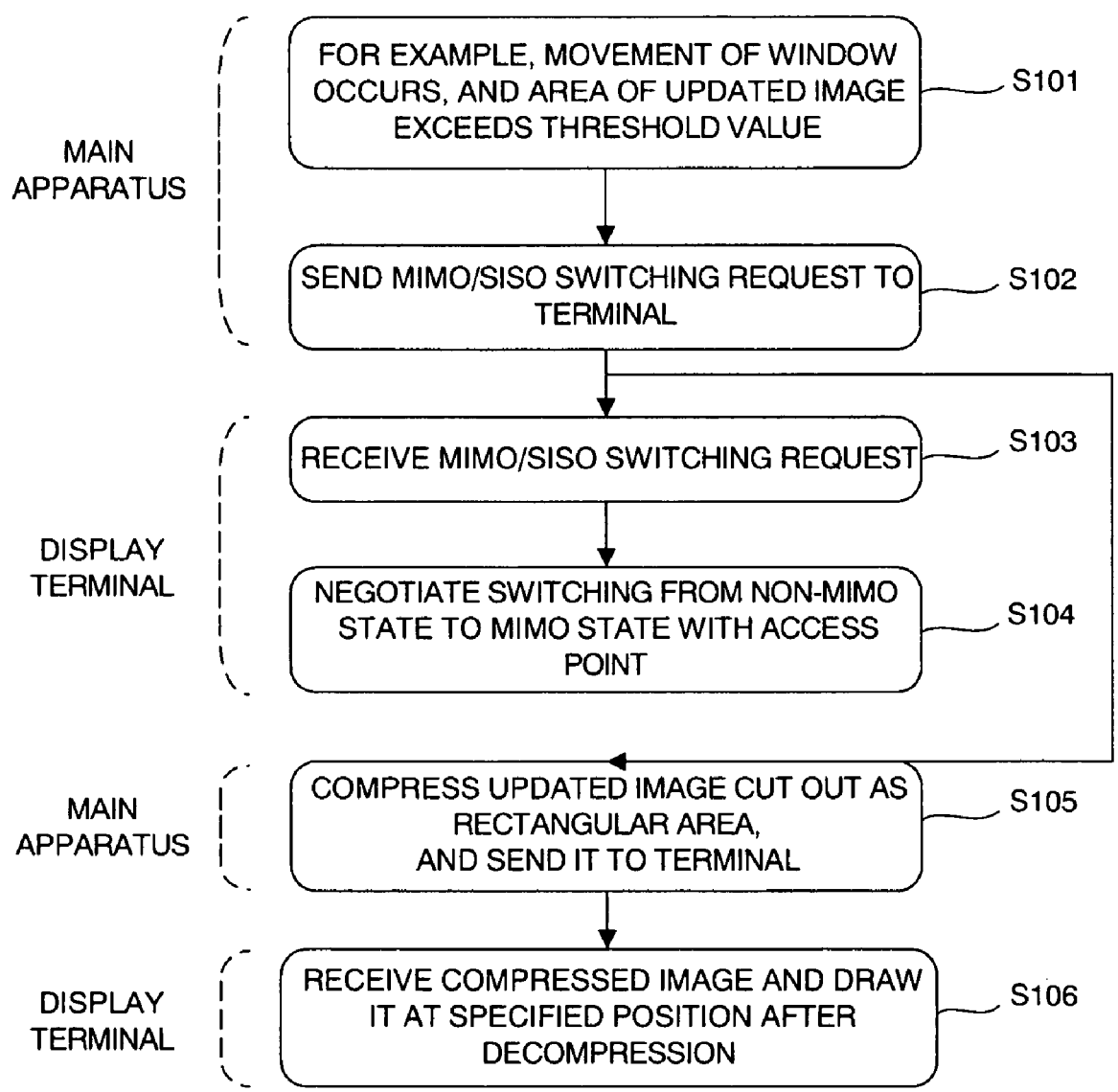
FIG. 10 is a flowchart showing a communication operation between the main apparatus and the display terminal.

FIG. 10 is a flowchart showing a communication operation between the main apparatus 1 and the display terminal 4.

The display terminal 4 includes plural antenna branches (receiving systems) and can perform MIMO transmission, and when the wireless communication processing unit 43 performs association with the wireless communication processing unit 33 of the access point 3, the MIMO power save field of the high throughput capability (HT Capability) information of the association request frame is designated in the static MIMO power save mode.

This designation allows the wireless communication processing unit 33 of the access point 3 which has received the association request to perform only SISO transmission to the wireless communication processing unit 43 of the display terminal 4 without performing MIMO physical frame transmission thereto.

Accordingly, when updates of a small screen area such as the manipulation of the cursor movement by the mouse continuously occur, in a wireless section between the display terminal 4 and the access point 3, SISO transmission is performed without MIMO transmission being performed, so that the wireless communication processing unit 43 of the display terminal 4 can also perform a standby operation and reception processing by power supply of only one receiving system (in the SISO state) and maintain a low power consumption state.

The window system is a mechanism on a computer which multiplexes a screen output by respectively assigning concurrent tasks their own areas (windows), and in an event such as appearance or disappearance of a new window accompanying the start of an application, movement of the window, scrolling in the window, or the start of an application to reproduce a moving image, a large update (such that the area of the updated area exceeds a predefined amount) generally occurs.

As a result, the information amount to be sent from the main apparatus 1 to the display terminal 4 also becomes large.

Hence, frame transmission from the access point 3 to the display terminal 4 shortens the time (duration) necessary for transmission and improves responsiveness by using MIMO compared to using SISO.

Therefore, if event information is detected, the switching determining unit 17 of the main apparatus 1 searches the condition storing unit 16 with the event information as a key and reads a flag associated with the event information.

When the flag is "1", it indicates that the screen is largely changed by a change in the state of the application such as a movement of the window on the window system.

Therefore, the switching determining unit 17 determines that the state of the wired communication processing unit 43 on the display terminal 4 side is switched from SISO to MIMO and notifies the message generating unit 18 of this determination.

The message generating unit 18 generates the MIMO/SISO switching request packet, in which the switching parameter is set, shown in FIG. 5 so as to switch from SISO to MIMO and sends it to the network 2 through the communication unit 19.

Incidentally, although the switching determining unit 17 determines the change in the state of the application as an input condition to determine switching between MIMO and SISO by detecting the event information being information from the OS, but other than this, the determination may be made by the size of the updated image to be sent.

For example, when the switching between MIMO and SISO is determined by the size of the updated image, if an update of the screen occurs, coordinate information on a rectangular area of an updated portion or data itself on an actual partial image is outputted from the event acquiring unit 12, and acquired by the difference detecting unit 14.

The difference detecting unit 14 detects a difference between an immediately preceding image stored in the image buffer 13 and the present image and outputs coordinate information on a rectangular area of this difference image to the switching determining unit 17.

When acquiring the coordinate information on the rectangular area of the difference image, the switching determining unit 17 compares an area value obtained from the product of a length in a lengthwise direction and a length in a crosswise direction and a given threshold value previously stored in the condition storing unit 16.

If the area value exceeds the threshold value as a result of this comparison (S101 in FIG. 10), the switching determining unit 17 determines that the state of the wireless communication processing unit 43 of the display terminal 4 is switched from SISO to MIMO and notifies the message generating unit 18 of this determination.

The message generating unit 18 generates the MIMO/SISO switching request packet in which the switching parameter is set so as to switch from SISO to MIMO and sends it to the network 2 through the communication unit 19 (S102).

In addition to the above, for example, in view of the number of colors per pixel, it may be determined that the state of the communication processing unit 43 of the display terminal 4 is switched from SISO to MIMO when the size of data before still image compression exceeds a given threshold value previously stored in the condition storing unit 16.

Incidentally, in a situation in which updates of the screen continuously occur, still image compression and sending to the display terminal for each update of the screen area is inefficient.

Hence, the determination may be performed in consideration of a certain amount of time and an updating situation of the screen by performing "frame dropping" processing in which plural times of updated rectangular area information are combined into one piece of rectangular area information.

Namely, as a condition for detecting a change in updated image and switching between SISO and MIMO, there are two cases where:

(1) the area of a rectangular area acquired every time an update of the screen occurs exceeds a given threshold value; and
(2) when frame dropping is used, an accumulated value of plural times of updated rectangular area information exceeds a preset given threshold value.

In these cases, the switching determining unit 17 determines that the transmission from the access point 3 to the display terminal 4 uses MIMO, that is, switching from SISO to MIMO is done.

In the main apparatus 1, after the MIMO/SISO switching request packet is sent, the send image generating unit 15 starts the still image compression processing of the updated image.

In the still image compression, to obtain a high compression rate, its calculation amount also increases, so that the time required until completion of the processing becomes longer.

In the display terminal 4, when the MIMO/SISO switching request packet is received by the wireless communication processing unit 43 (S103), the received packet is analyzed.

When the result of this analysis indicates a MIMO/SISO switching request, the wireless communication processing unit 43 sends a MIMO PSMA (Power Save Management Action) frame to the access point 3, and to switch from the SISO state (non-MIMO state) to the MIMO state, negotiation on mutual states is performed between the wireless communication processing unit 43 and the wireless communication processing unit 33 of the access point 3 (S104). A certain fixed time is required until this negotiation is completed.

In the main apparatus 1, before the send image generating unit 15 starts the still image compression for the updated image cut out in a rectangular shape, the message generating unit 18 generates the MIMO/SISO switching request packet and sends it from the communication unit 19 to the display terminal 4.

Namely, before the updated image is received, the MIMO/SISO switching request packet is received by the communication wireless processing unit 43 of the display terminal 4, and notice is given to the switching controller 45.

Thus, the switching controller 45 switches the communication state of the wireless communication processing unit 43 from the SISO state to the MIMO state and gives notice to the access point 3.

The wireless communication processing unit 43 waits for reception of a packet of a compressed image sent from the main apparatus 1 in a state of having notified the access point 3 of the completion of switching.

At that time, the send image generating unit 15 of the main apparatus 1 performs still image compression on the updated image cut out as the rectangular area to generate the packet and sends it from the communication unit 19 to the display terminal 4 (S105).

In the display terminal 4, when the packet of the compressed image is received by the wireless communication processing unit 43, the updated image is drawn at a specified position of the screen of the display 51 after being decompressed by the screen generating unit 47 (S106).

Incidentally, in the display terminal 4, the SISO state of the wireless communication processing unit 43 means the state in the static MIMO power save mode in which the access point 3 is entirely prohibited from sending MIMO PPDU.

Further, the MIMO state means a state in which the dynamic MIMO power save mode in which plural antenna branches (receiving systems) are activated at the time of frame exchange or normal MIMO operation mode without consideration of power saving can be used.

Here, the operation of the entire system will be described with reference to FIG. 11 and FIG. 12.

When the OS is started by turning on a power button or the like, the display terminal 4 starts communication with the access point 3 in the state of SISO (static MIMO power save mode).

Figure 11:
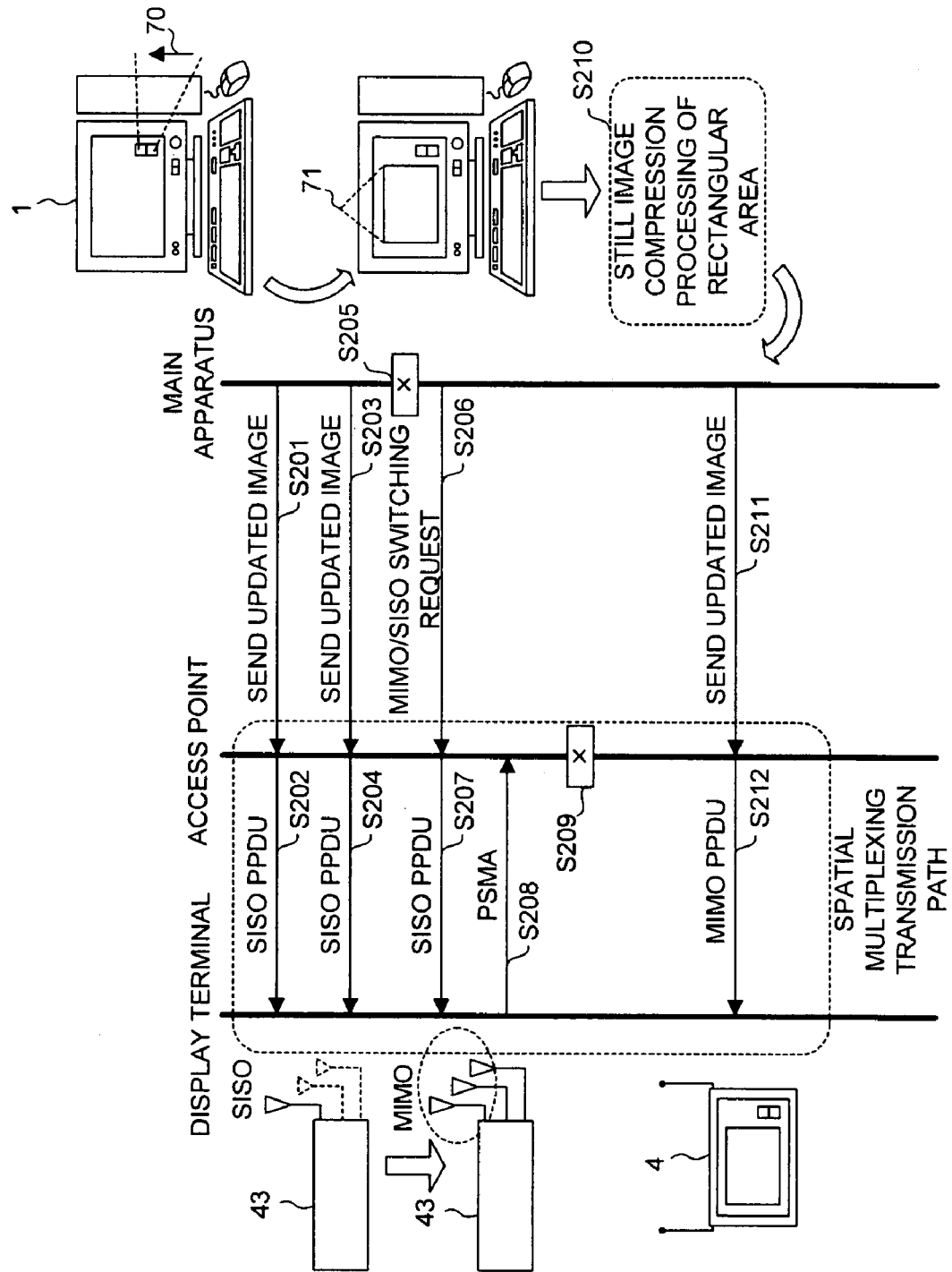
FIG. 11 is a communication sequence diagram showing the operation of the entire screen transfer system.
Figure 12:
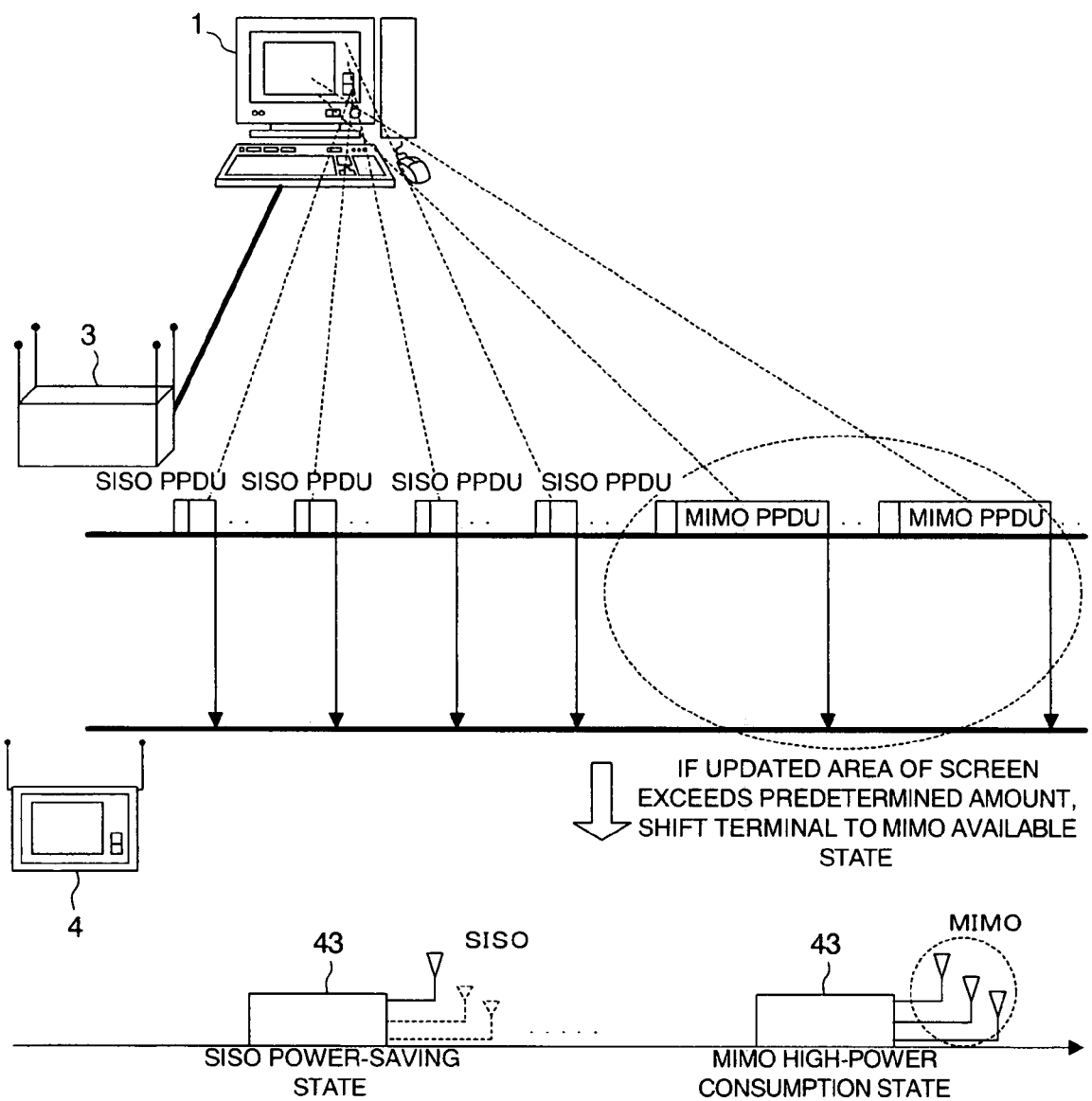
FIG. 12 is a diagram to explain a switching operation from SISO to MIMO.

If a small screen update 70 such as a cursor movement occurs on the window system of the main apparatus 1, an updated image is sent from the main apparatus 1 to the access point 3 (S201 in FIG. 11).

A single spatial stream physical frame (SISO PPDU) is sent from the access point 3 (S202) and received by the display terminal 4.

Then, every time the small screen update 70 occurs, the updated image is sent from the main apparatus 1 to the access point 3 (S203).

The single spatial stream physical frame (SISO PPDU) is sent again from the access point 3 (S204).

Thereafter, if a large-sized screen update 71, for example, an appearance of a new window, such as exceeds the threshold value in the condition storing unit 16 occurs on the main apparatus 1 (S205), the MIMO/SISO switching request packet is sent from the main apparatus 1 to the access point 3 (S206).

Also in this case, the single spatial stream physical frame (SISO PPDU) is sent from the access point 3 (S207) and received by the display terminal 4.

In the display terminal 4, when the MIMO/SISO switching request packet is received from the access point 3 by SISO transmission, the switching controller 45 controls the power-saving controller 44 so that power is supplied to all the receiving circuits and switches the state of the wireless communication processing unit 43 from SISO to MIMO, then the PSMA (Power Save Management Action) frame is generated and sent to the access point 3, and a notice that the communication state is switched from SISO to MIMO is given (S208).

In the access point 3, when PSMA is received by the wireless communication processing unit 33, the wireless communication processing unit 33 recognizes at this point in time that the display terminal 4 comes to be able to receive the MIMO physical frame (S209).

In the main apparatus 1, at a point in time when the event of the large-sized screen update 71 occurs, the MIMO/SISO switching request packet generated by the message generating unit 18 is sent to the display terminal.

Then, still image compression processing of the updated image is performed by the send image generating unit 15 (S210).

Then, when the still image compression is completed, the compressed image is packetized and sent to the access point 3 (S211).

From the access point 3, the physical frame by MIMO transmission (MIMO PPDU) is sent to the display terminal 4 (S212).

When the packet of the compressed image sent from the main apparatus 1 arrives at the access point 3, the display terminal 4 comes to be able to receive the physical frame by MIMO transmission, and consequently large data can be received at high speed and displayed.

Next, the operations of respective apparatuses including the main apparatus 1, the access point 3, and the display terminal 4 will be described with reference to FIG. 13 to FIG. 15.

Figure 13:
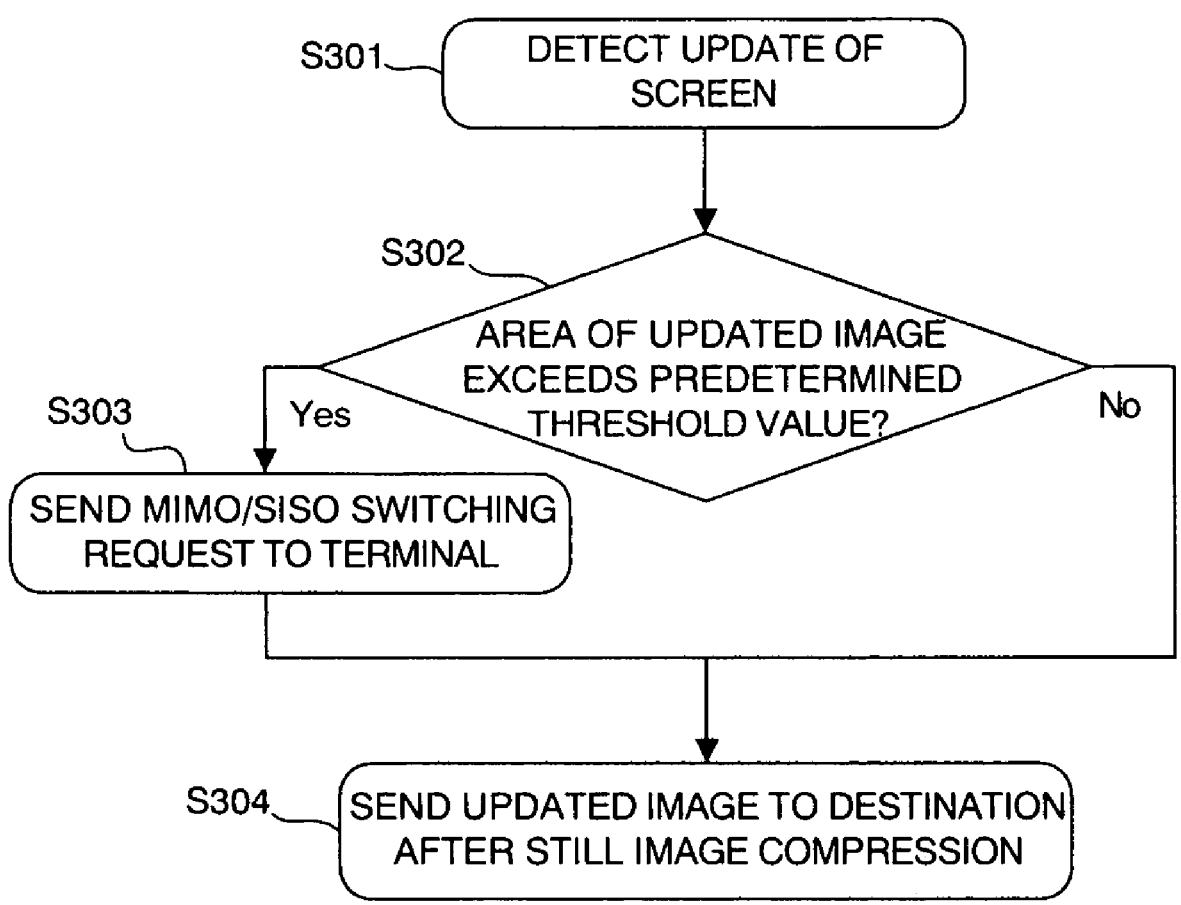
FIG. 13 is a flowchart showing the operation of the main apparatus.

As shown in FIG. 13, in the main apparatus 1, when an event such as an appearance of a window occurs within the display screen by the screen transfer application or the like, image data on an area updated within the display screen is outputted from the event acquiring unit 12, and an update of the screen is detected by the difference detecting unit 14 (S301 in FIG. 13).

Then, the difference detecting unit 14 detects a difference between an immediately preceding image stored in the image buffer 13 and an image inputted this time, outputs an image of the difference (hereinafter referred to as an "updated image") to the send image generating unit 15, and simultaneously outputs coordinate information on a rectangular area of the updated image to the switching determining unit 17.

When the event information outputted from the event acquiring unit 12 is inputted to the switching determining unit 17, the switching determining unit 17 determines that the state of the screen transfer application has changed.

When acquiring the coordinate information on the rectangular area of the updated image outputted from the difference detecting unit 14, the switching determining unit 17 compares an area value obtained from the product of a length in a lengthwise direction and a length in a crosswise direction and the given threshold value previously stored in the condition storing unit 16.

If the area value exceeds the threshold value as a result of this comparison (Yes in S303), the switching determining unit 17 determines that the state of the wireless communication processing unit 43 of the display terminal 4 is switched from SISO to MIMO and notifies the message generating unit 18 of this determination.

The message generating unit 18 generates the MIMO/SISO switching request packet in which the switching parameter is set so as to switch from SISO to MIMO and sends it to the network 2 through the communication unit 19 (S303).

On the other hand, when the updated image is inputted, the send image generating unit 15 subjects the inputted updated image to still image compression, then generates a packet containing the compressed image and a destination communicated from the session manager 21, and passes it to the communication unit 19, and the packet is sent from the communication unit 19 to the display terminal having the destination (S304).

Figure 14:
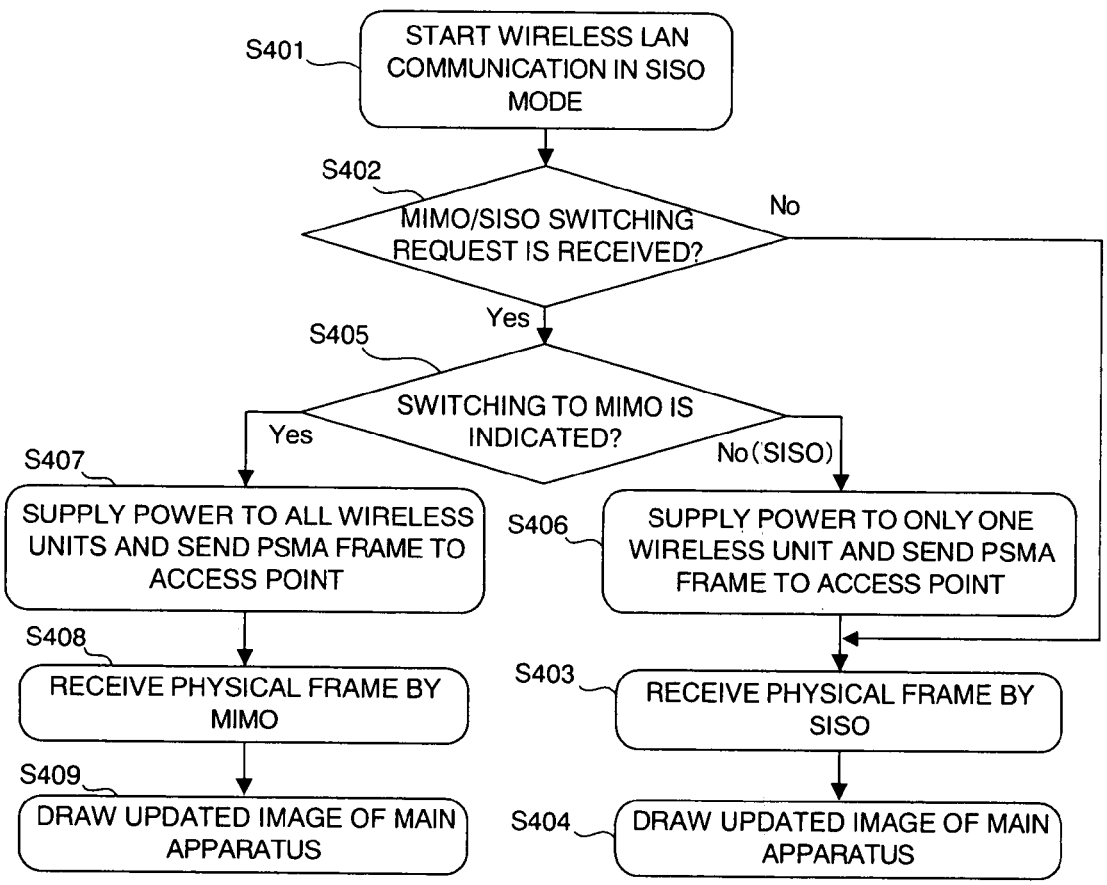
FIG. 14 is a flowchart showing the operation of the display terminal.

As shown in FIG. 14, in the display terminal 4, when the OS is started by turning on the power, the wireless communication processing unit 43 starts wireless LAN communication in a SISO mode (S401).

Every time a packet is received, the type of the packet is determined (S402).

If the type of the received packet is not the MIMO/SISO switching request packet (No in S402), the wireless communication processing unit 43 continues the reception of the physical frame in the SISO transmission mode (S403), and draws the updated image of the screen updated in the main apparatus (S404).

On the other hand, if the type of the received packet is the MIMO/SISO switching request packet (Yes in S402), the wireless communication processing unit 43 passes the MIMO/SISO parameter extracted from the packet to the switching controller 45.

The switching controller 45 determines from the value of the passed MIMO/SISO parameter whether switching to MIMO is indicated (S405).

If switching to MIMO is not indicated as a result of this determination (No in S405), the receiving terminal continues to receive only SISO packets and, the switching controller 45 sends the PSMA frame to the access point 3 while controlling the power-saving controller 44 to supply power to only one antenna branch (analog circuit 64 for reception) out of plural antenna branches (S406).

Further, if switching to MIMO is indicated as a result of the above determination (Yes in S405), the switching controller 45 controls the power-saving controller 44 of the wireless communication processing unit 43 operating in the SISO mode to supply power to all of the plural antenna branches (analog circuits 64 for reception) and sends the PSMA frame in which information indicating switching of the communication state is set to the access point 3 (S407).

The wireless communication processing unit 43 to all the plural antenna branches of which the power is supplied comes to be able to receive the physical frame in a MIMO mode (S408).

Then, the wireless communication processing unit 43 takes the updated image out of the packet sent from the main apparatus 1 and received in the MIMO mode from the access point 3 and draws it on the display 51 (S409).

Figure 15:
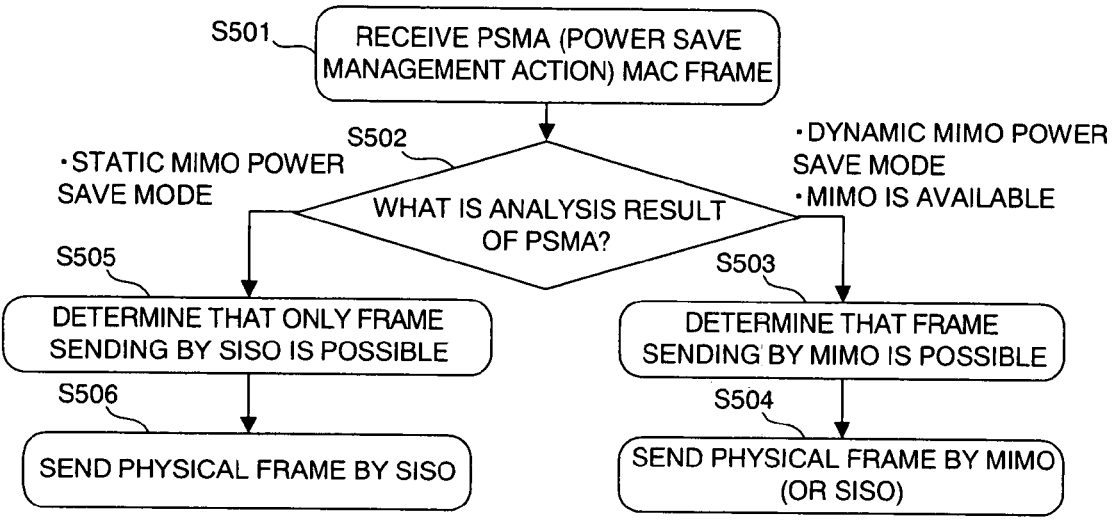
FIG. 15 is a flowchart showing the operation of the access point.

As shown in FIG. 15, in the access point 3, when receiving a PSMA MAC frame (S501), the wireless communication unit 33 analyzes the contents of the PSMA frame (S502).

If the result of this analysis indicates, for example, either the dynamic MIMO power save mode or that MIMO is available, the power-saving controller 36 determines that sending of the PSMA frame by MIMO to a terminal at the sending end of PSMA is possible (S503).

Based on this determination, the access point 3 sends the physical frame by MIMO (or SISO) to the display terminal 4 as the terminal at the sending end (S504).

If the analysis result indicates, for example, the static MIMO power save mode, the power-saving controller 36 determines that the sending of the PSMA frame by SISO to the terminal at the sending end of PSMA is possible (S505), and as at the time of frame reception, sends the physical frame by SISO to the display terminal 4 as the terminal at the sending end while supplying power to one antenna branch (S506).

Here, an operation example when the switching controller 45 of the display terminal 4 switches the state of the wireless communication processing unit 43 to MIMO and returns it again to SISO will be described.

If a state where the area of the rectangular area at an update of the screen on the window system falls within a given threshold value continues for a given unit time or more, it is recommended to perform low-power consumption SISO transmission rather than MIMO transmission in the wireless section.

Therefore, the message generating unit 18 gives notice to switch the state of the wireless communication processing unit 43 from MIMO to SISO to the display terminal 4 using the MIMO/SISO switching request packet shown in FIG. 5.

At this time, the message generating unit 18 sets information on a period specifying how long the period of the MIMO state is valid in the time information field contained in the MIMO/SISO switching request packet.

Consequently, in the display terminal 4 which has received the MIMO/SISO switching request packet, the switching controller 45 switches the operating state of the wireless communication processing unit 43 from SISO to MIMO and then releases the state of MIMO after the specified period.

Namely, when the specified period has passed, the switching controller 45 of the display terminal 4 returns the state of the wireless communication processing unit 43 to SISO and gives a state change notice (sends the MIMO PSMA frame) to the access point 3.

In this case, in the main apparatus 1, every time a large screen update occurs, the switching determining unit 17 determines switching to MIMO, and the message generating unit 18 sends the MIMO/SISO switching request packet.

Accompanying this, the switching controller 45 of the display terminal 4 updates the time information until the state returns to the SISO state.

The message generating unit 18 sets factor information on the screen update in the event information field contained in the MIMO/SISO switching request packet.

Consequently, in the display terminal 4 which has received the MIMO/SISO switching request packet, when a factor of the screen update extracted from the received packet indicates a reduction in screen update such as an end of a moving image reproduction application, the switching controller 45 may apply control of performing reception of the updated image due to the window disappearance and display processing and then returning the state of the wireless communication processing unit 43 to SISO.

As described above, among MIMO/SISO switching control methods in the display terminal 4, there are a method of automatically returning to the SISO state after a given time after switching from SISO to MIMO, a method of returning to the SISO state when the rectangular area or data amount (screen size information field) of the screen information on the main apparatus 1 received and displayed per unit time falls below a given threshold value, and so on, but even if any method is used, the same effect can be obtained.

As described above, according to the screen transfer system of this embodiment, when a small-size screen update which need not be transmitted by MIMO occurs on the screen of the main apparatus 1, power consumption can be suppressed by putting the wireless communication processing unit 43 of the display terminal 4 in the SISO state.

On the other hand, when the event of the application such as appearance or movement of the window occurs in the window system of the main apparatus 1 and a large-sized update occurs, the main apparatus 1 performs the switching control between SISO and MIMO properly on the display terminal 4, which makes it possible to reduce a high-power consumption state by MIMO transmission as much as possible and obtain high responsiveness by MIMO transmission.

Incidentally, if the determination of switching from SISO to MIMO operation is performed by controlling only the wireless MAC layer, image information is fragmented to a threshold value of MTU (Maximum Transfer Unit: maximum transmission size) or less and transferred to the MAC layer, which makes analysis of the actual updated rectangular area difficult and requires a given amount of time to exchange a control frame between the access point 3 and the display terminal 4.

Hence, the timing of the start of MIMO transmission is delayed, and satisfactory responsiveness cannot be exhibited.

On the other hand, in the present invention, when the display terminals 4 and 5 are usually operated in the SISO state, and an application which requires generation of traffic in a burst manner on the network 2 and fast responsiveness is used on the main apparatus 1 side, the operating states of SISO and MIMO of the wireless communication processing units 43 of the display terminals 4 and 5 can be efficiently switched by notifying the display terminals 4 and 5 via the access point 3 of the above fact.

Namely, it is possible to realize lower power consumption while maintaining the high-speed transmission performance of MIMO transmission when the image of the updated portion is transmitted due to the event occurring on the screen.

It should be noted that the present invention is not limited to only the above embodiment and can be embodied by modifying components without departing from the gist thereof.

Further, various inventions can be made by appropriately combining plural components disclosed in the above embodiment.

For example, some components may be omitted from all the components shown in the embodiment. Further, components in different embodiments may be appropriately combined.

Concretely speaking, in the above embodiment, the determination for MIMO/SISO switching is made by inputting both the difference value between images and the event information to the switching determining unit 17, but a constitution in which only the difference value between images is inputted, or a constitution in which only the event information is inputted is also possible.

Although only the operation between the main apparatus 1 and the display terminal 4 is described, an operation between the main apparatus 1 and the display terminal 5 is the same as the case of the above embodiment. Further, also when the display terminal 4 and the display terminal 5 are simultaneously connected to the main apparatus 1, each of the display terminals 4 and 5 operates in the same manner as in the above embodiment.

Furthermore, it is also possible to, when an application in which updates exceeding a given area such as scrolling in the window and moving image reproduction in addition to the movement of the window and the appearance of the window continuously occur is activated, determine detection thereof as occurrence of a change in the state of the application and perform control of switching the state of the wireless communication processing unit 43 from SISO to MIMO on the display terminals 4 and 5.

Moreover, the rectangular area to be sent may be an area acquired from plural updated rectangular areas through the frame dropping processing according to the band of the network 2.

In addition to this, it is also possible to acquire the area of one rectangular area acquired every time an update of the screen is detected or information on a cumulative area of plural updated rectangular areas and perform control of switching the states of the wireless communication processing units 43 of the display terminals 4 and 5 from SISO to MIMO.

What is claimed is:

1. A communication apparatus configured to connect to a display terminal via a wireless access apparatus allowed to freely change a spatial multiplexing number of a spatial multiplexing transmission path, comprising:
   a first generation unit which generates image data in accordance with an event occurring due to a change in an operating state of an application program;
   a difference detecting unit which detects a difference between a plurality of consecutive image data generated by said first generation unit;
   a second generation unit which generates send data to be sent to the display terminal by compressing the difference;
   a message generating unit which generates a message to change the spatial multiplexing number to either one or a plural number according to the change in the operating state of the application program or the difference;
   a sending unit which sends the send data to the display terminal and sends the message to the wireless access apparatus prior to sending the send data;
   a storage unit which stores spatial multiplexing number switching information on the spatial multiplexing transmission path in association with information on the event occurring due to the change in the operating state of the application program; and
   an event acquiring unit which acquires the information on the event occurring due to the change in the operating state of the application program, wherein
   said message generating unit reads the spatial multiplexing number switching information associated with the information on the event acquired by said event acquiring unit from said storage unit and generates the message to change the spatial multiplexing number.

2. The communication apparatus according to claim 1, wherein said message generating unit generates a message to increase the spatial multiplexing number of the wireless transmission path if the difference is larger than a preset threshold value.

3. A display terminal, comprising:
   plural antenna branches which send/receive a message to/from a wireless access apparatus via a spatial multiplexing transmission path, and receive image data sent from a communication apparatus via the wireless access apparatus;
   a switching controller which if a message to change a multiplexing number of the spatial multiplexing transmission path is received by said antenna branch, switches said plural antenna branches to a communication state of either spatial multiplexing transmission or single transmission according to the message;
   a power-saving controller which while one antenna branch of said plural antenna branches is operating in the state of single transmission, stops power supply to the other antenna branches;
   a display which displays a screen; and
   an image generating unit which displays the image data from the communication apparatus received by said antenna branch at a specified position of the screen.

4. A communication method of a communication apparatus configured to connect to a display terminal via a wireless access apparatus allowed to freely change a spatial multiplexing number of a spatial multiplexing transmission path, comprising:
   generating image data to be displayed on the display terminal in accordance with an event occurring due to a change in an operating state of an application program;
   detecting a difference between a plurality of consecutive generated image data;
   generating send data to be sent to the display terminal by compressing the detected difference;
   generating a message to change the spatial multiplexing number of the spatial multiplexing transmission path to either one or a plural number according to the change in the operating state of the application program which has caused the event or a value of the difference;
   sending the message to the wireless access apparatus prior to sending the send data to the display terminal;
   storing spatial multiplexing number switching information on the spatial multiplexing transmission path in a storing unit in association with information on the event occurring due to the change in the operating state of the application program;

acquiring the information on the event occurring due to the change in the operating state of the application program; and reading the spatial multiplexing number switching information associated with the acquired information on the event from the storage unit and generating the message to change the spatial multiplexing number of the spatial multiplexing transmission path.

5. The method according to claim 4, wherein a message to increase the spatial multiplexing number of the spatial multiplexing transmission path is generated if the detected difference is larger than a predetermined threshold value.

* * * * *